United States Patent
Wang et al.

(10) Patent No.: US 10,384,968 B2
(45) Date of Patent: Aug. 20, 2019

(54) TERNARY SEWAGE TREATMENT METHOD INTEGRATING MICROBIAL FUEL CELLS WITH ANAEROBIC ACIDIFICATION AND FORWARD OSMOSIS MEMBRANE

(71) Applicant: Jiangnan University, Wuxi (CN)

(72) Inventors: Xinhua Wang, Wuxi (CN); Jinmeng Liu, Wuxi (CN); Yuqin Lu, Wuxi (CN); Xiufen Li, Wuxi (CN)

(73) Assignee: JIANGNAN UNIVERSITY, Wuxi (CN)

(*) Notice: Subject to any disclaimer, the term of this patent is extended or adjusted under 35 U.S.C. 154(b) by 97 days.

(21) Appl. No.: 15/571,397

(22) PCT Filed: Jul. 28, 2016

(86) PCT No.: PCT/CN2016/092012
§ 371 (c)(1),
(2) Date: Nov. 2, 2017

(87) PCT Pub. No.: WO2018/010217
PCT Pub. Date: Jan. 18, 2018

(65) Prior Publication Data
US 2019/0119136 A1    Apr. 25, 2019

(30) Foreign Application Priority Data
Jul. 15, 2016 (CN) .......................... 2016 1 0559203

(51) Int. Cl.
*C02F 9/00* (2006.01)
*B01D 61/08* (2006.01)
(Continued)

(52) U.S. Cl.
CPC .............. *C02F 9/00* (2013.01); *B01D 61/005* (2013.01); *B01D 61/08* (2013.01); *B01D 61/18* (2013.01);
(Continued)

(58) Field of Classification Search
CPC ...... C02F 2303/10; C02F 3/005; C02F 1/441; C02F 1/444; C02F 1/445; C02F 1/46109;
(Continued)

(56) References Cited

U.S. PATENT DOCUMENTS

| 2014/0224717 A1* | 8/2014 | Juby | ............... | H01M 8/16 |
|---|---|---|---|---|
| | | | | 210/151 |
| 2016/0137536 A1 | 5/2016 | Nam et al. | | |

FOREIGN PATENT DOCUMENTS

| CN | 103332835 A | 10/2013 |
|---|---|---|
| CN | 103449602 A | 12/2013 |

(Continued)

*Primary Examiner* — Claire A Norris
(74) *Attorney, Agent, or Firm* — Na Xu; IPro, PLLC

(57) ABSTRACT

The invention relates to a ternary sewage treatment method integrating microbial fuel cells with anaerobic acidification and forward osmosis membrane, and belongs to the technical field of sewage treatment. The method of the invention comprises the following steps:
Sewage is driven into the anaerobic acidification device for mixture with the NaOH solution. The mixed liquid enters into the MFC for converting the enriched organics to bioelectricity and then flows back to the anaerobic acidification device. A part of the mixed liquid passes through the MF membrane module to form effluent and enters into the sedimentation basin for phosphate removal and finally passes through activated carbon adsorption column, another part passes through the FO membrane module to form effluent and obtain high quality recycled water after the RO membrane processing. The method is a new coupled model of FO membrane and MFC and it provide a ternary combined technique integrating MFCs with anaerobic acidification and FO membrane. The change and accumulation of sewage to organic acids are achieved under anaerobic acid production and FO retention, the electricity generation performance of MFC is improved, and the reuse of reclaimed (Continued)

water is realized by separating of FO and RO membranes. Finally, the wastewater reuse and electricity generation are realized synchronously.

16 Claims, 1 Drawing Sheet

(51) Int. Cl.

| | |
|---|---|
| *B01D 61/18* | (2006.01) |
| *B01D 61/58* | (2006.01) |
| *H01M 8/16* | (2006.01) |
| *C02F 3/00* | (2006.01) |
| *H01M 4/96* | (2006.01) |
| *B01D 61/00* | (2006.01) |
| *C02F 3/28* | (2006.01) |
| *C02F 1/44* | (2006.01) |
| *C02F 1/28* | (2006.01) |
| *C02F 1/00* | (2006.01) |
| *C02F 1/66* | (2006.01) |
| *C02F 101/10* | (2006.01) |
| *C02F 101/16* | (2006.01) |

(52) U.S. Cl.
 CPC .............. *B01D 61/58* (2013.01); *H01M 4/96* (2013.01); *H01M 8/16* (2013.01); *B01D 2311/2626* (2013.01); *B01D 2311/2684* (2013.01); *C02F 1/283* (2013.01); *C02F 1/441* (2013.01); *C02F 1/444* (2013.01); *C02F 1/445* (2013.01); *C02F 1/66* (2013.01); *C02F 3/005* (2013.01); *C02F 3/284* (2013.01); *C02F 3/2853* (2013.01); *C02F 2001/007* (2013.01); *C02F 2101/105* (2013.01); *C02F 2101/16* (2013.01); *C02F 2209/02* (2013.01); *C02F 2209/06* (2013.01); *C02F 2303/20* (2013.01)

(58) Field of Classification Search
 CPC .. C02F 2201/46115; C02F 9/00; B01D 69/02; B01D 61/005; B01D 61/08; B01D 61/18; B01D 61/58; H01M 4/96; H01M 8/16
 USPC ............................................... 210/631; 429/2
 See application file for complete search history.

(56) References Cited

FOREIGN PATENT DOCUMENTS

| | | |
|---|---|---|
| CN | 104681843 A | 6/2015 |
| CN | 105330106 A | 2/2016 |

* cited by examiner

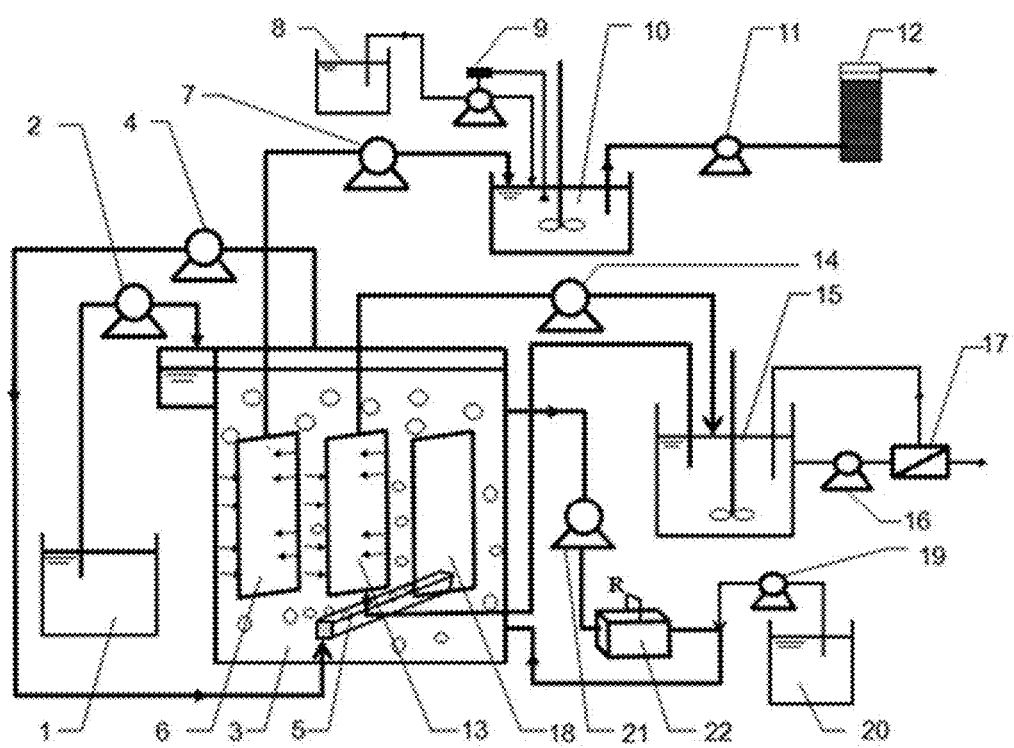

TERNARY SEWAGE TREATMENT METHOD INTEGRATING MICROBIAL FUEL CELLS WITH ANAEROBIC ACIDIFICATION AND FORWARD OSMOSIS MEMBRANE

TECHNICAL FIELD

The invention relates to a ternary sewage treatment method integrating microbial fuel cells with anaerobic acidification and forward osmosis membrane, and belongs to the technical field of sewage treatment.

BACKGROUND

With the economic and social development and the population growth, domestic and industrial water consumption correspondingly increased. The statistical report of the Ministry of Environmental Protection shows that city sewage discharge amount in China is up to a total 71.62 billion tons in 2015, together with worsening water pollution, and many cities and districts have faced water resource crisis. The city sewage contains only 1% of pollutants and has merits such as nearby available, amount stable, easy collection, etc. So, reuse of municipal wastewater is the first choice to solve the problem of water shortage in all over the world. At present, aerobic biological treatment is the main method used in city sewage treatment, which needs large energy consumption. Therefore, it is necessary to search for other alternative techniques in order to reduce the energy consumption.

Forward osmosis membrane separation technique (forward osmosis, FO) has become a research hotspot in wastewater treatment and reuse due to its own unique advantages. In FO process, water passes through a semi-permeable membrane from lower to higher salt concentration side while solute molecules or ions are rejected. The driving force is actually a difference in chemical potential because the lower the concentration, the higher the water chemical potential. Since there is no need to apply pressure, so that the desired power consumption is low. In addition, FO also has advantages of good effluent-quality and low membrane fouling. However, the remaining concentrates from the feed side of FO and the energy stored in organic contaminants are not recovered.

A microbial fuel cell (MFC) is a bio-electrochemical system that drives an electric current by using bacteria and mimicking bacterial interactions found in nature. It has great potential in wastewater treatment. However, the main obstacle in MFC for wastewater treatment is that the effluent-quality is poor and fails in reaching discharge or reuse standards directly.

SUMMARY

To solve the problem, the present invention creatively presents a new coupled process of FO and MFC and an anaerobic reactor and brings about the improvement of sewage quality and the enrichment of organics by using high efficiency retention of organic compounds of FO membrane. At the same time, the organic matters in sewage can be turned into low-molecular-weight organic acids by means of anaerobic acid production technology to further improve the electricity production performance of MFC. The present invention constructs a new ternary sewage treatment with low energy consumption for synchronous reuse of wastewater and biological electricity recovery.

The first objective of the present invention is to provide an anaerobic reactor for integrating MFCs with anaerobic acidification and FO membrane.

In one embodiment of the present invention, the anaerobic reactor mainly includes anaerobic acidification device, draw solution pool, reverse osmosis (RO) device, microbial fuel cell (MFC) device, sedimentation basin, adsorption device; the anaerobic acid producing device comprises a microfiltration (MF) membrane and an FO membrane; The MF membrane is connected with the sedimentation basin through pipelines; The sedimentation basin is connected with the adsorption device through pipelines; The FO membrane is connected with the draw solution pool through pipelines; The draw solution pool is connected with the RO device; The MFC device is connected to an anaerobic acidification device.

In one embodiment of the present invention, the anaerobic acidification device includes baffles.

In one embodiment of the present invention, an aeration pipe is installed in the lower portion of the anaerobic acidification device.

In one embodiment of the present invention, one end of the air pump is connected with the aeration pipe and the other end extends to the upper part of the anaerobic acidification device.

In one embodiment of the present invention, the sedimentation basin is a chemical sedimentation basin and is connected with a pH controller.

In one embodiment of the present invention, the pH controller is connected to the first NaOH solution pool.

In one embodiment of the present invention, the middle and the upper parts of the sedimentation basin are connected with the adsorption device through pipelines and a water pump.

In one embodiment of the present invention, the adsorption device is an activated carbon adsorption column.

In one embodiment of the present invention, the FO membrane module and the draw solution pool constitute a cycle through a pump and pipelines.

In one embodiment of the present invention, the draw solution pool and the RO membrane processing device constitute a cycle through a high-pressure pump and pipelines.

In one embodiment of the present invention, the material of FO membrane can be any of Cellulose Triacetate (CTA), Thin-film Composite Polyamide (TFC) and Polyethersulfone (PES).

In one embodiment of the present invention, the area of FO membrane is 0.025 $m^2$.

In one embodiment of the present invention, the material of RO membrane in RO device can be any of Cellulose Triacetate (CTA), Polyamide (TFC).

In one embodiment of the present invention, MF membrane can be any of Polyvinylidene fluoride (PVDF), Polysulfone (PSF), Polyacrylonitrile (PAN), Polyvinyl chloride (PVC), Polypropylene (PP), etc.

In one embodiment of the present invention, the mean pore size of the MF membrane is 0.1-1 μm.

In one embodiment of the present invention, the MF membrane area is about 0.025 $m^2$, pore size is about 0.20 μm.

In one embodiment of the present invention, the MF membrane module is any of a flat membrane module, a hollow fiber membrane module or a tubular membrane module.

In one embodiment of the present invention, the MFC is a single chamber air cathode MFC, the anode material is a carbon felt, and the cathode material is an activated carbon-PTFE air cathode.

In one embodiment of the present invention, the MFC is a single chamber air cathode MFC, the effective volume is 160 mL; the anode material is a carbon felt, the anode area is 40 cm$^2$; the cathode material is the activated carbon-PTFE air cathode, and the cathode area is 40 cm$^2$.

In one embodiment of the present invention, the anaerobic acidification device and the MFC constitute a loop through a circulating pump and pipelines.

In one embodiment of the present invention, the anaerobic acidification device is connected with the second NaOH solution pool by an alkali additive pump and pipelines.

The second objective of the present invention is to provide a sewage treatment method based on the anaerobic reactor for integrating MFCs with anaerobic acidification and FO membrane. Output water may be discharged directly or reused, organics in the sewage can be recovered in the form of bio-electricity at the same time.

In the present embodiment, the sewage is municipal sewage.

The sewage treatment method comprises the steps of:

1) The sewage as influent water is driven into the anaerobic acidification device through the influent pump, NaOH solution is driven into the anaerobic acid production area by an alkali additive pump at the same time. The NaOH solution is uniformly mixed due to aeration.

2) There is an FO membrane module in the anaerobic acidification device, water passes through by using the osmotic pressure difference between the draw solution and the feed solution on both sides of the FO membrane. The membrane effluent is further processed into the subsequent RO system and effluent water can be directly reused; At the same time the MF membrane controls salinity build-up in the reactor, the effluent from the membrane enters into the sedimentation basin and removes total phosphorus in the alkaline environment in the form of phosphate precipitation, the remaining ammonia nitrogen is absorbed by the adsorption unit, so then the effluent water quality reaches the water quality standard for urban miscellaneous water reuse.

3) The mixed liquid in the anaerobic acid producing area enters into the MFC continuously through the circulating pump and then flows back to the anaerobic acid producing area. In the process, the trapped organic pollutants are recovered in the form of bio-electricity.

In the present invention, the anaerobic acidification device, MFC and FO membrane constitute a ternary combined technique. The anaerobic acidification device has two outlets for mixing liquid circulating between the anaerobic acidification device and the MFC. The FO membrane is immersed in the anaerobic acidification device, and the water passes through the FO membrane by the raw solution and then the high quality recycled water is obtained through filtrating the draw solution by the RO membrane. Through the self-aeration system using the biogas producing in the anaerobic acidification device, a certain hydraulic circulation is formed in the anaerobic acidification device, which can improve the mass transfer and alleviate membrane fouling.

In one embodiment of the present invention, the NaOH solution refers to 0.2M NaOH solution, with a pH of 12-14.

In one embodiment of the present invention, the MF membrane and FO membrane are immersed in the liquid level of the anaerobic acidification device.

In one embodiment of the present invention, the draw solution refers to 0.5M NaCl solution.

In one embodiment of the present invention, the material of FO membrane can be any of CTA, TFC and PES. The area of FO membrane is 0.025 m$^2$.

In one embodiment of the present invention, MF membrane can be any of PVDF, PSF, PAN, PVC, PP, etc. The area membrane area is 0.025 m$^2$, pore size is about 0.20 μm.

In one embodiment of the present invention, the alkaline environment of the step (2) means controlling the pH 11 through the pH controller.

In one embodiment of the present invention, the remaining ammonia nitrogen in MF membrane effluent is absorbed by the adsorption unit with activated carbon. The amount of activated carbon is 50 g/L, and the retention time is 12 h.

In one embodiment of the present invention, the MFC is a single chamber air cathode MFC, the anode material is a carbon felt, and the cathode material is an activated carbon-PTFE air cathode.

In one embodiment of the present invention, the MFC is a single chamber air cathode MFC, the effective volume is 160 mL; the anode material is a carbon felt, the anode area is 40 cm$^2$; the cathode material is the activated carbon-PTFE air cathode, and the cathode area is 40 cm$^2$.

The advantages of the present invention lie in: the ternary combined technique is a new coupled model of FO membranes and MFC, which brings about the improvement of sewage quality and the enrichment of organics by using FO membrane with a high rejection for organic matters. Not only sewage reuse can be realized, but also organic acids can improve the electricity production performance, finally realizes the sewage utilization.

Compared with the prior technique, the present invention has the following advantages:

(1) It is a change of the traditional combination of FO and MFC, which makes the system easier to enlarge. The FO membrane was applied as a separator between the anode and the cathode instead of the proton exchange membrane in existing FO and the MFC coupled system (OsMFC). In this case, water through an FO membrane driven by the osmotic pressure difference will accelerate H$^+$ from anode to cathode, and thus the bio-electricity generated from MFCs is improved. In the invention, the FO and the MFC are sectionalizing-coupled and FO membrane is used to hold back organics instead of being used as a proton exchange membrane, which improved the sewage quality and enriched the organic acids. By this way, not only sewage reuse can be realized, but also organic acids can improve the electricity production performance of the device. In addition, adding MF membrane can control salt accumulation and prolong the running time of the FO membrane, and water after further processing from MF membrane can meet the requirement of Reuse of Urban Recycling Water& Water Quality Standard for Urban Miscellaneous Water Consumption. (GB/T 18920-2002) and be used for flushing, greening etc. The addition of MF membrane can effectively mitigate the fouling of FO membrane. Compared with the existing OsMFC, the running time of the FO membrane increases obviously.

(2) It brings about the improvement of sewage quality and the enrichment of organics by using FO membrane with a high rejection.

(3) With the help of anaerobic acid production technology, the enriched organics can be changed into small molecule organic acids, which are more easily used by MFC to improve the electricity generation performance.

(4) The enriched organics can be recovered in the form of bioelectricity to realize the reuse of sewage by using MFC.

BRIEF DESCRIPTION OF FIGURES

FIG. 1 is a general schematic diagram of a ternary anaerobic reactor of the present invention for integrating MFCs with anaerobic acidification and FO membrane.

In the diagrams: 1: influent basin, 2: influent pump, 3: anaerobic acidification device, 4: air pump, 5: aeration pipe, 6: MF membrane module, 7: suction pump, 8: the first NaOH solution pool, 9: pH controller, 10: sedimentation basin, 11: water pump, 12: adsorption device, 13: FO membrane module, 14: draw solution pump, 15: draw solution pool, 16: high-pressure pump, 17: RO membrane device, 18: baffle, 19: alkali additive pump, 20: the second NaOH solution pool, 21: circulating pump, 22: MFC.

DETAILED DESCRIPTION

A further description of the present invention is provided in conjunction with the diagrams and embodiments:

Embodiment 1: A Ternary Combination Anaerobic Reactor

FIG. 1 is the anaerobic reactor's general frame diagram of the present invention.

The ternary anaerobic reactor of the present invention for integrating MFCs with anaerobic acidification and FO membrane mainly comprises of anaerobic acidification device 3, draw solution pool 15, RO membrane device 17, MFC 22, sedimentation basin 10, adsorption device 12; The anaerobic acidification device comprises of MF membrane module 6, FO membrane module 13; The MF membrane module 6 is connected with the sedimentation basin 10 through pipelines, and the sedimentation basin 10 is connected with the adsorption device 12 through pipelines; The FO membrane module 13 is connected with the draw solution pool 15 through pipelines and the draw solution pool 15 is connected with the RO membrane device 17; The MFC device 22 is connected to the anaerobic acidification device 3.

The anaerobic acidification device 3 also contains a baffle 18 which is used to increase the cross-flow rate and form a certain scour on the membrane surface, thus alleviating membrane fouling.

The bottom of the anaerobic acidification device 3 is installed with an aeration pipe 5 which is connected to the upper part of the anaerobic acidification device 3 by the air pump 4 and the pipelines; The air pump 4 is used to circulate the biogas produced at the upper part of the anaerobic anaerobic acidification 3 to the aeration pipe 5. Through the self-aeration system, a certain hydraulic circulation is formed in the anaerobic acidification device, which can improve the mass transfer and alleviate membrane fouling.

Optionally, the sedimentation basin 10 is a chemical sedimentation basin and is connected with the pH controller 9. The pH controller 9 is connected to the first NaOH solution pool 8. The middle and upper part of the sedimentation basin is connected with the adsorption device 12 through pipelines and a water pump 11.

Optionally, the suction device 12 is activated carbon adsorption column.

Optionally, the FO membrane module 13 and the draw solution pool 15 constitute a cycle through the draw solution pump 14 and pipelines. The concentrated draw solution is continued to be used for the extraction of water from the FO membrane. The interception of FO membrane is driven by an osmotic pressure.

Optionally, the draw solution pool 15 and the RO membrane device 17 constitute a cycle through the high-pressure pump 16 and pipelines and the concentrated salt solution on one side of the RO membrane flows back to the draw solution pool 15 through the high-pressure pump 16 to achieve regeneration and recycling of the draw solution. The water treated by FO membrane and RO membrane can achieve a high-quality water requirement.

Optionally, the pore size of the MF membrane is 0.1-1 μm.

Optionally, the MFC is a single chamber air cathode MFC, the anode material is a carbon felt, and the cathode material is an activated carbon-PTFE air cathode.

Optionally, the anaerobic acidification device 3 and MFC 22 constitute a cycle through the circulating pump 21 and pipelines. The mixed sludge in the anaerobic acidification 3 enters into the MFC 22 continuously through the circulating pump 21 for converting the enriched organics to bio-electricity, and then flows back to the anaerobic acidification device 3.

Optionally, the second NaOH solution pool 20 and the anaerobic acidification device 3 are connected by the alkali additive pump 19 and pipelines. NaOH solution in the second NaOH solution pool 20 is incorporated into the water outlet pipe of the MFC22 by the alkali additive pump 19, and with the MFC effluent into the anaerobic acidification device 3, in order to maintain pH in the anaerobic acidification device 3.

Embodiment 2: The Principle of the Ternary Combination Anaerobic Reactor

The connection methods and composition of the anaerobic reactor is as shown in FIG. 1.

The sewage in influent basin 1 is driven into the anaerobic acidification device 3 through the influent pump 2. The NaOH solution in the NaOH solution pool 20 is driven into the anaerobic acid production area by an alkali additive pump 19 and uniformly mixed due to aeration pipe 5 at the same time. The air pump 4 is used to circulate the biogas produced at the upper part of the anaerobic acidification device 3 to the aeration pipe 5. Through the self-aeration system, a certain hydraulic circulation is formed in the anaerobic acidification device, which can improve the mass transfer and alleviate membrane fouling.

The mixed liquid enters into the MFC 22 under the action of the MFC circulating pump 21 for converting the enriched organics to bio-electricity, and then flows back to the anaerobic acidification device 3. A part of the mixed liquid passes through the MF membrane module 6 to form effluent on the effect of the suction pump 7 and enters into the sedimentation basin 10 for phosphate removal, pH in the sedimentation basin 10 is controlled by the pH controller 9 and the first NaOH solution pool 8. Then the supernatant in the sedimentation basin 10 enters into the adsorption device 12 under the action of the water pump 11 and finally gets reclaimed water that meet the requirement of Reuse of Urban Recycling Water& Water Quality Standard for Urban Miscellaneous Water Consumption (GB/T 18920-2002). Another part of the mixed liquid passes through the FO membrane module 13 to form effluent under the action of osmotic pressure difference over the FO membrane, thus the effluent can be directly recycled after the subsequent RO membrane processing. At the same time, the concentrated salt solution on the side of the RO membrane flows back to the draw solution pool 15 through the high-pressure pump 16 to realize the regeneration and recycling of the draw solution.

Embodiment 3

A ternary anaerobic reactor as shown in FIG. 1 is adopted in the embodiment. The anaerobic reactor operates at room temperature, and the pH of the anaerobic acid producing region of the reactor is controlled at 8.5±0.5. The influent water is simulated municipal wastewater prepared artificially, and the water-quality index is: TOC: 150±1.96 mg/L, $NH_3$—N: 22.7±1.27 mg/L, TN: 27.13±1.88 mg/L, TP: 2.29±0.18 mg/L. The FO membrane module 13 adopts CTA, the membrane area is 0.025 $m^2$; and the MF component 6 adopts a flat membrane module using PVDF material with a membrane area of 0.025 $m^2$ and a mean pore size of about 0.2 μm. Sewage is driven into the anaerobic acidification device 3 by water pump 2 for mixture with the NaOH solution from the alkali additive pump 19. The mixed liquid enters into the MFC 22 under the action of the MFC circulating pump 21 for converting the enriched organics to bio-electricity, and then flows back to the anaerobic acidification device 3. A part of the mixed liquid passes through the MF membrane module 6 to form effluent on the effect of the suction pump 7 and enters into the sedimentation basin 10 for phosphate removal, finally gets reclaimed water reached the standard on the Reuse of Urban Recycling Water& Water Quality Standard for Urban Miscellaneous Water Consumption (GB/T 18920-2002) after activated carbon adsorption column 12. Another part of the mixed liquid passes through the FO membrane module 13 to form effluent under the action of osmotic pressure difference over the FO membrane, thus the effluent can be directly recycled after the subsequent RO membrane processing. The aeration of the anaerobic acid producing region is carried out by using the biogas produced by itself and is supplied by the aeration pipe 5. A certain amount of sludge is discharged every day, the sludge retention time (SRT) is maintained at 80 d, the concentration of mixed liquor suspended matter is 3~4 g/L, and the aeration rate is 2 L/min. The device operation time is maintained at 80 d, physical backwashing is adopted for FO membrane cleaning, and 5 h immersion with 0.1% sodium hypochlorite is adopted for MF membrane cleaning. Compared with the integrated OsMFC, the FO membrane of the device has a lower membrane fouling tendency, a higher flux and a longer running time. The effluent-quality of FO membrane is: TOC: 1.07±1.55 mg/L, $NH_3$—N: 14.52±1.37 mg/L, TN: 16.30±1.87 mg/L, TP: 0.25±0.24 mg/L. COD and TP are 0, while $NH_3$—N and TN are less than 5 mg/L after RO processing; MF effluent-quality after chemical precipitation and activated carbon adsorption is: COD: 20 mg/L, TP: 0.1 mg/l, $NH_4$—N: 4.79 mg/L. MFC voltage output is periodically changed, which is always stable at about 440 mV. Compared with the OsMFC, it has more stable power generation effect.

Embodiment 4

A ternary anaerobic reactor as shown in FIG. 1 is adopted in the embodiment. The anaerobic reactor operates at a constant temperature room with temperature controlled at 30±0.5° C., and the pH of the reactor is controlled at 9.5±0.5. The water inlet is simulated municipal wastewater prepared artificially, and the water-quality index is: TOC: 150±1.96 mg/L, $NH_3$—N: 22.7±1.27 mg/L, TN: 27.13±1.88 mg/L, TP: 2.29±0.18 mg/L. The FO membrane module 13 adopts TFC, the membrane area is 0.025 $m^2$ and the MF component 6 adopts a flat membrane module using PVDF material with a membrane area of 0.025 $m^2$ and a mean pore size of about 0.2 μm. The reactor operation time is maintained at 23 d without any cleaning of membrane modules. Influent quality is: TOC: 145.9±1.97 mg/L, $NH_3$—N: 27.11±1.27 mg/L, TN: 31.5±0.85 mg/L, TP: 2.57±0.15 mg/L, Effluent quality of FO is: TOC: 4.94±0.86 mg/L, $NH_3$—N: 24.08±2.68 mg/L, TN: 25.41±2.69 mg/L, TP: 0.5±0.19 mg/L. COD and TP are 0, while $NH_3$—N and TN are less than 5 mg/L after RO processing; MF effluent-quality after chemical precipitation and activated carbon adsorption is: COD: 20 mg/L, TP: 0.1 mg/l, $NH_4$—N: 4.05 mg/L. MFC has sustained and relatively stable voltage output which is always stable at about 420 mV.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A ternary anaerobic reactor for integrating microbial fuel cells (MFCs) with anaerobic acidification and forward osmosis (FO) membrane, comprising an anaerobic acidification device, a draw solution pool, a reverse osmosis (RO) membrane device, an MFC, a sedimentation basin, and an adsorption device; wherein the anaerobic acidification device contains an microfiltration (MF) membrane module and an FO membrane module; wherein the MF membrane module is connected with the sedimentation basin through pipelines, and the sedimentation basin is connected with the adsorption device through pipelines; wherein the FO membrane module is connected with the draw solution pool through pipelines and the draw solution pool is connected with the RO membrane device; wherein the MFC device is connected to the anaerobic acidification device.

2. The ternary anaerobic reactor according to claim 1, wherein the anaerobic acidification device is provided with an installed aeration pipe in a bottom; wherein one end of an air pump is configured to be connected with the aeration pipe and the other end is configured to extend to an upper part of the anaerobic acidification device.

3. The ternary anaerobic reactor according to claim 1, wherein the FO membrane module and the draw solution pool constitute a cycle through a draw liquid pump and pipelines.

4. The ternary anaerobic reactor according to claim 1, wherein the draw solution pool and the RO membrane device are connected through a high-pressure pump and pipelines.

5. The ternary anaerobic reactor according to claim 1, wherein the anaerobic acidification device and MFC are connected through a circulating pump and pipelines.

6. The ternary anaerobic reactor according to claim 1, wherein the anaerobic acidification device comprises baffles.

7. The ternary anaerobic reactor according to claim 1, wherein the MFC is a single chamber air cathode MFC, with an anode material comprising a carbon felt, and a cathode material comprising an activated carbon-Polytetrafluoroethylene (PTFE) air cathode.

8. A method of using the ternary anaerobic reactor of claim 1, comprising the steps of:
   1) driving a sewage as influent into the anaerobic acidification device through an influent pump, and driving a NaOH solution into an anaerobic acid production area by an alkali additive pump at the same time; wherein the NaOH solution is uniformly mixed with the sewage to form a mixed liquid due to aeration;

2) with the FO membrane module in the anaerobic acidification device, passing the mixed liquid therethrough by using osmotic pressure difference between a draw solution and the mixed liquid on both sides of the FO membrane to form a membrane effluent; further processing the membrane effluent into the subsequent RO system; wherein at the same time the MF membrane controls salinity build-up in the reactor, passing the membrane effluent from the MF membrane into the sedimentation basin and removing total phosphorus in the alkaline environment in the form of phosphate precipitation; and absorbing remaining ammonia nitrogen by the adsorption device; and 3) passing the mixed liquid into the MFC continuously through a circulating pump and then flowing it back to the anaerobic acid production area; and recovering trapped organic pollutants in the form of bio-electricity in the process.

9. The method according to claim 8, wherein the material of the FO membrane is any of Cellulose Triacetate (CTA), Thin-film Composite Polyamide (TFC) and Polyethersulfone (PES); and wherein the material of the MF membrane is any of Polyvinylidene fluoride (PVDF), Polysulfone (PSF), Polyacrylonitrile (PAN), Polyvinyl chloride (PVC), and Polypropylene (PP).

10. The method according to claim 8, wherein the NaOH solution is 0.2M NaOH solution with a pH of 12-14.

11. The method according to claim 8, wherein the MF membrane and FO membrane are configured to be immersed in the liquid level of the anaerobic acidification device.

12. The method according to claim 8, wherein the draw solution is 0.5M NaCl solution.

13. The method according to claim 8, wherein the alkaline environment of the step (2) means that the pH value is set at about 11 through a pH controller.

14. The method according to claim 8, further comprising absorbing the remaining ammonia nitrogen in MF membrane effluent by the adsorption unit with activated carbon; wherein the amount of activated carbon is 50 g/L, and the retention time is 12 h.

15. The method according to claim 8, wherein the MFC is a single chamber air cathode MFC, with an anode material comprising a carbon felt, and a cathode material comprising an activated carbon-PTFE air cathode.

16. The method according to claim 8, wherein the MFC is a single chamber air cathode MFC, with an effective volume of 160 mL, with an anode material comprising a carbon felt and an anode area of 40 $cm^2$, and with a cathode material comprising an activated carbon-PTFE air cathode and a cathode area of 40 $cm^2$.

* * * * *